Feb. 11, 1930.  F. G. W. BRISTOW  1,746,989
SHEEP SHEARING MACHINE COMB
Filed March 9, 1928

OLD TYPE

OLD TYPE

OLD TYPE

INVENTOR:
Franciss George William Bristow
BY: Reeps, Boyce & Bakelar
ATTORNEYS.

Patented Feb. 11, 1930

1,746,989

UNITED STATES PATENT OFFICE

FRANCISS GEORGE WILLIAM BRISTOW, OF AUBURN, NEAR SYDNEY, NEW SOUTH WALES, AUSTRALIA

SHEEP-SHEARING-MACHINE COMB

Application filed March 9, 1923, Serial No. 260,280, and in Australia March 15, 1927.

Shearing machine combs are made in various widths ranging for a ten tooth comb from 2¼" wide to 2½" wide, with various tooth spacings according to the over-all width of the comb. As it is necessary that the three tines of the cutter must make a full cover on the comb teeth in order to ensure a complete "blow", cutters must be used corresponding in their tine spacing with the tooth spacing of the combs with which they are to be used. Thus a 2¼" comb requires a 2¼" type cutter, and a 2⅜" or a 2½" cutter cannot be used with it, nor can a 2¼" or a 2½" cutter be used on a 2⅜" comb, nor can a 2¼" or a 2⅜" cutter be used on a 2½" comb.

The object of the present invention is to provide a standard width 2½" comb on which any standard cutter either 2¼", 2⅜" or 2½" type will be satisfactorily usable, and it consists in a comb having its teeth centered appropriately and the outer teeth specially formed so that all the tines of any of these standard cutters will make full cover on the comb teeth and so be enabled to effect full cuts. Revision of the tooth centrings of the comb is impracticable unless the shape and dimensions of the outer teeth are also modified appropriately from standard practice and the length of those teeth extended.

In the accompanying drawings:—

Figure 1:
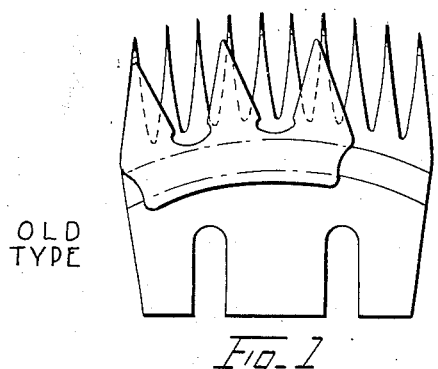
Fig. 1 is a plan view of a 2¼" cutter working on a 2¼" comb. In this and in the succeeding views the cutter position is shown at one end of the stroke.

The comb in which the present invention consists is that shown in Figs. 4, 5, 6 and 7.

When a shearing machine hand-piece has suffered any considerable use the throw of the fork is diminished consequent on the lost motion due to wear in the bearing surfaces. It is consequently necessary that the comb should be so designed when it is required to work with the various cutters in use that a full blow will be taken not only when the hand-piece is in new condition but when it has suffered more or less wear and the throw of the fork is consequently lessened. In the drawings, the extreme positions of the cutters on the combs are shown for a hand-piece in new condition. It will be observed, referring to Fig. 1, that there is a considerable overlap of the cutter points across the comb teeth to allow for the lost motion due to wear of the hand-piece. The same comment applies to Fig. 2 and Fig. 3. It will be observed also that a sufficient overlap to provide for lost motion is also available in the combs according to the present invention indicated in Figs. 4, 5 and 6, the three cutters, 2¼", 2⅜" and 2½" all having sufficient overlap for this purpose. The extreme right hand tooth in the 2½" cutter has just enough overlap for security, and it is not practicable to provide in this case for the same measure of overlap for all the teeth of the cutter as is obtainable in the Fig. 4 and Fig. 5 arrangements.

Figure 2:
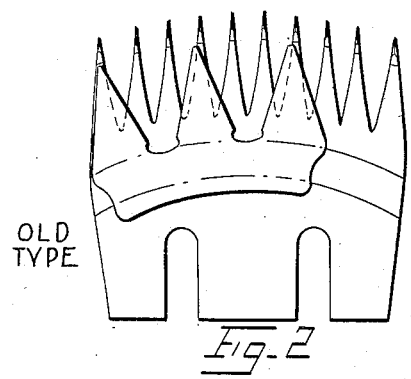
Fig. 2 is a similar plan view showing a 2⅜" cutter on a 2⅜" comb.
Figure 3:
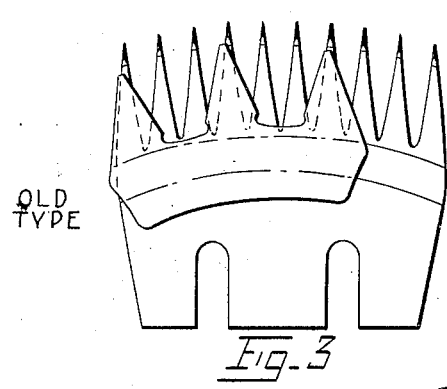
Fig. 3 is a similar view showing a 2½" cutter on a 2½" comb.
Figure 4:
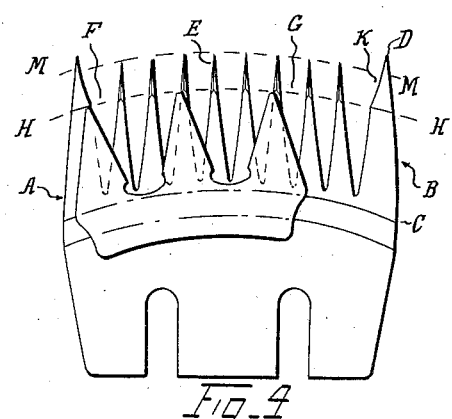
Fig. 4 is a similar view showing a 2¼" cutter on a 2½" comb.
Figure 5:
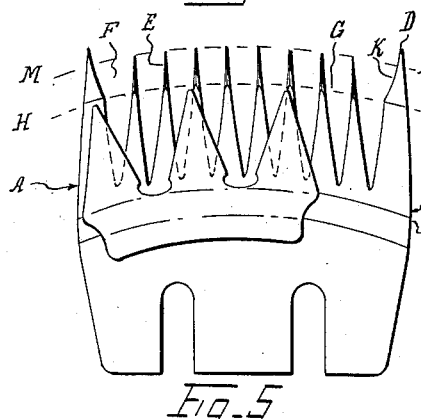
Fig. 5 is a 2⅜" cutter on a 2½" comb.
Figure 6:
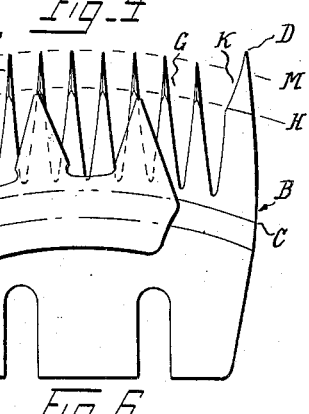
Fig. 6 is a plan view of a 2½" cutter on a 2½" comb.

The characteristics of the comb shown in Figs. 4, 5, and 6, are in the shape and dimensions of the outer teeth A and B in a comb in which the intermediate teeth are centred and shaped, and spaced similarly to the existing 2¼" and 2⅜" combs shown in Figs. 1 and 2, but not in correspondence with the 2½" standard comb, Fig. 3.

The outer sides of the outer teeth A and B are carried forwardly on nearly parallel lines from the shoulder C to the tips D and these teeth are extended forwardly of the arc (M—M in dotted lines) which is touched by the points of the intermediate teeth E. The spacing in the gullets F between the outermost of the intermediate teeth E and the outer teeth A and B corresponds with the intermediate gullet spacings G, but forwardly of the gullet arc (H—H in dotted lines) that is the arc at the base of the teeth points, the outer teeth D are ground out on the inner side as indicated at K. A wide entry is thus provided for the two outermost gullets F, ensuring the taking in of a full 2½" swath.

Contrasting this new 2½" universal comb with the standard 2½" comb shown in Fig. 3, two distinctions are apparent. In the Fig. 3 type of comb all the tooth shapes and centrings and all the gullet measurements are identical. In the Fig. 4 new type of comb, all the gullet measurements are identical with those in the standard 2¼" comb and the standard 2⅜" comb, but the outer teeth A and B are longer and broader than the intermediate teeth, and the outermost gullets F are provided with wide mouthings obtained by grinding out concavely the inner sides of the outer teeth A and B between the gullet and the point D, as shown at K. The result of this re-arrangement is that the new type of 2½" comb shown in Figs. 4, 5, and 6 is equally usable with standard 2¼", 2⅜" and 2½" cutters, a sufficient overlap of all the cutter tines on the comb teeth being obtained in all cases to ensure a full cutting blow.

Figure 7:
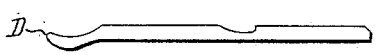
Fig. 7 is a side elevation of the new comb.
Figure 7:
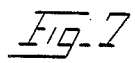

The points of all the teeth in the new type of comb are curved downwardly and finished in a cyma-like curve, the concave portion of the curve on the top sides of the points being very slightly above the level of the bottom of the comb. The bottom faces of the teeth points being thus depressed in a shoe-like shape below the bottom of the comb face function in the well-known way as runners. This facilitates the driving of the comb through the fleece, whilst the down setting preserves the teeth points from interference in regrinding the comb so that they are not needled or otherwise affected and throughout the useful life of the comb maintain their original shape and finish. The side elevational view of the comb shown in Fig. 7 illustrates this feature of construction which is the basis of my United States Patent No. 1,567,110, dated December 29, 1925.

What I claim as my invention and desire to secure by Letters Patent is:—

1. A sheep shearing machine comb adapted for use with standard 2¼", 2⅜" and 2½" cutters, characterized in that its outer teeth are broadened and are substantially straight on their outer sides and are extended forwardly of the arc touched by the tips of the intermediate teeth, that the intermediate teeth are shaped and centred and gulleted in correspondence with standard 2¼" and 2⅜" combs, and that the outer teeth forward of the gullet arc are ground out on the inner sides to bring them to points 2½" apart substantially as described.

2. A sheep shearing machine comb adapted for use with standard 2¼", 2⅛" and 2½" cutters, characterized in that its outer teeth are broadened and are substantially straight on their outer sides and are extended forwardly of the arc touched by the tips of the intermediate teeth, that the intermediate teeth are shaped and centred and gulleted in correspondence with standard 2¼", 2⅜" combs, and that the outer teeth forward of the gullet arc are ground out concavely on the inner sides to bring them to points 2½" apart substantially as described.

3. A sheep shearing machine comb having eight intermediate teeth shaped and centred in accordance with standard 2¼" and 2⅜" cutters, the outer teeth being substantially straight on their outer sides and extended in width to bring the outer dimensions of the comb to 2½" at the point, and the inner faces of the outer teeth forward of the gullet arc ground relatively obtusely to offer a wide mouthing for the two outer gullets substantially as described.

4. A sheep shearing machine comb having eight intermediate teeth shaped and centred in accordance with standard 2¼" and 2⅜" cutters, the outer teeth being substantially straight on their outer sides and extended in width to bring the outer dimensions of the comb to 2½" at the point, and the inner faces of the outer teeth forward of the gullet arc concavely ground relatively obtusely to offer a wide mouthing for the two outer gullets substantially as described.

In testimony whereof I affix my signature.

FRANCISS GEORGE WILLIAM BRISTOW.